United States Patent [19]

Timor

[11] Patent Number: 4,600,110
[45] Date of Patent: Jul. 15, 1986

[54] DISKETTE HOLDER

[76] Inventor: Andrés Timor, 6759 SW. N. Waterway Dr., Miami, Fla. 33155

[21] Appl. No.: 618,684

[22] Filed: Jun. 8, 1984

[51] Int. Cl.⁴ ............................................. A47H 13/00
[52] U.S. Cl. .................................... 211/120; 211/40; 211/41; 211/184; 211/189
[58] Field of Search ................ 211/120, 40, 41, 69.8, 211/184, 189, 186; 403/167; 248/222.4

[56] References Cited

U.S. PATENT DOCUMENTS

| 570,657 | 11/1896 | Beckwith | 211/184 X |
|---|---|---|---|
| 628,943 | 7/1899 | Nasik | 211/40 |
| 1,120,941 | 12/1914 | Jones | 211/40 X |
| 1,371,629 | 3/1921 | Kolby . | |
| 1,822,734 | 9/1931 | Harrington | 211/120 |
| 2,238,451 | 4/1941 | Roth | 211/40 |
| 2,430,624 | 11/1947 | Vollmer | 211/120 |
| 3,053,495 | 9/1962 | Schmier | 248/222.4 X |
| 3,171,542 | 3/1965 | Jacobs et al. | 211/184 X |
| 3,623,615 | 11/1971 | Kawachi | 211/40 |
| 4,162,013 | 7/1979 | Tucker | 211/184 X |

FOREIGN PATENT DOCUMENTS

| 1145081 | 3/1969 | United Kingdom | 211/40 |
|---|---|---|---|
| 2057857 | 4/1981 | United Kingdom | 211/94 |

Primary Examiner—Ramon S. Britts
Assistant Examiner—Blair M. Johnson
Attorney, Agent, or Firm—Oltman and Flynn

[57] ABSTRACT

A temporary holder for computer diskettes and their envelopes in the form of a knockdown assembly having two rigid, upstanding, opposite end pieces, two bottom rails extending horizontally between the end pieces, and normally flat, thin, vinyl strips flexed into an inverted U-shape and held end-to-end by the bottom rails between the end pieces to provide successive slots in which diskettes or their envelopes can be inserted and resiliently held temporarily.

2 Claims, 9 Drawing Figures

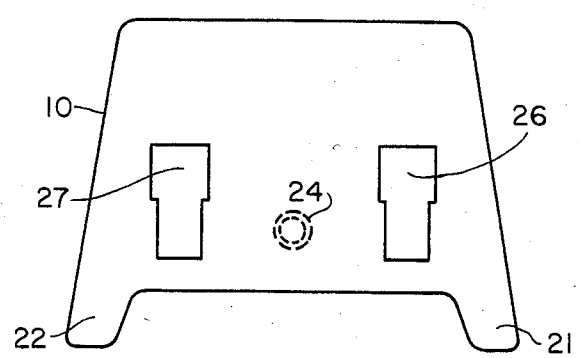
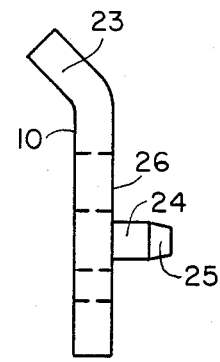
Fig 3    Fig 4
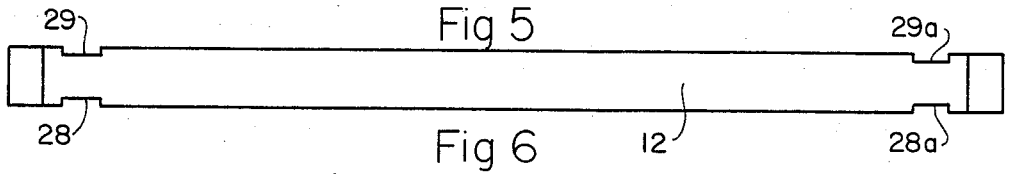
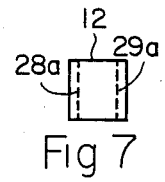
Fig 5    Fig 7
Fig 6
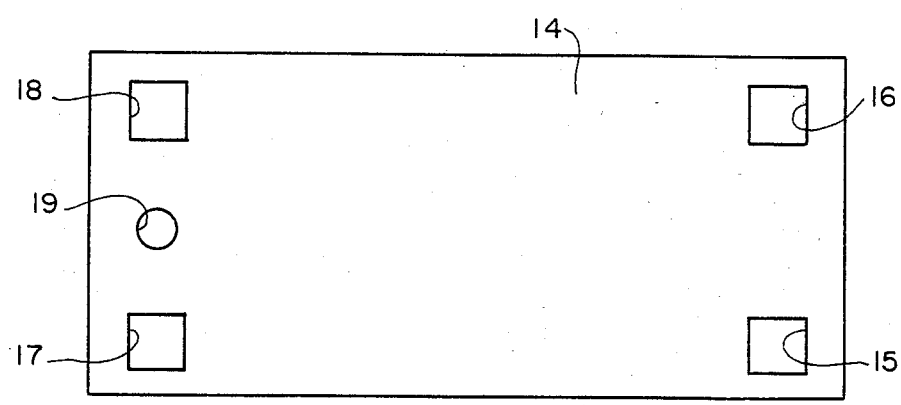
Fig 8
Fig 9

DISKETTE HOLDER

SUMMARY OF THE INVENTION

This invention relates to a holder for computer diskettes which keeps several diskettes grouped together temporarily for quick and easy access.

Often a microcomputer has fewer disk drives than the number of floppy diskettes required for a particular job. The floppy diskettes which are not in use at any particular moment should be conveniently accessible so that one diskette may be replaced by another in the computer whenever desired. A diskette which has just been replaced should now be stored in such a manner that it can be put back in the computer whenever desired. Also, the envelope for any diskette which is in a disk drive should be stored so that it is conveniently available to receive the diskette whenever it is removed from the disk drive.

This invention provides a novel holder for storing both diskettes (in their envelopes) which are not in use in the computer and the envelopes for diskettes which are in use. This holder enables any one diskette or envelope to be removed without disturbing the others, using only one hand.

Preferably, the present holder has a plurality of flexible and resilient strips of vinyl or the like bent into inverted U-shaped and held end-to-end along rigid bottom rails between upstanding rigid end pieces. In one practical embodiment, this provides vertical slots at one inch intervals along the holder, each of which can receive an individual diskette (in its envelope or without its envelope. The slot between either end piece and the closest inverted U-shaped strip can hold one or more envelopes of the diskettes which are in the computer disk drives.

A principal object of this invention is to provide a novel holder for computer diskettes and their envelopes which enables them to be temporarily stored in an organized manner which safeguards them from damage and makes them individually accessible readily.

Further objects and advantages of this invention will be apparent from the following detailed description of a presently preferred embodiment which is illustrated schematically in the accompanying drawings.

DESCRIPTION OF THE DRAWINGS

FIG. 3 is an end elevational view of one of the end pieces in the diskette holder;

FIG. 4 is a side elevation of the end piece shown in FIG. 3;

FIG. 5 is a side elevation of one of the longitudinal bottom rails in the diskette holder;

FIG. 6 is a top plan view of the bottom rail shown in FIG. 5;

FIG. 7 is an end elevation of this bottom rail;

FIG. 8 is a top plan view of one of the flexible and resilient strips in the present diskette holder before its assembly into the holder; and FIG. 9 is a side elevational view of this strip.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
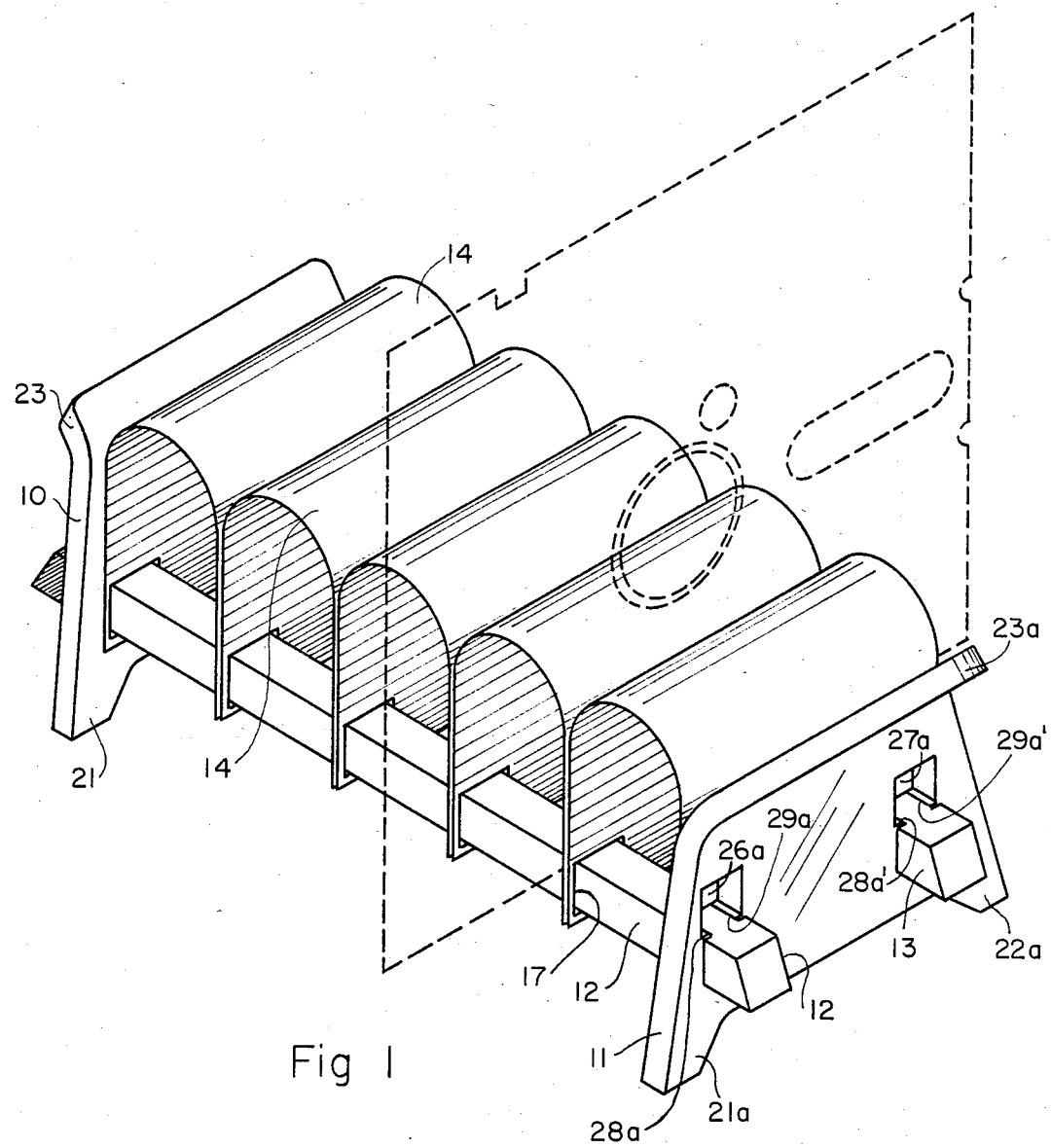
FIG. 1 is a perspective view of the present diskette holder in its assembled condition.
Figure 2:
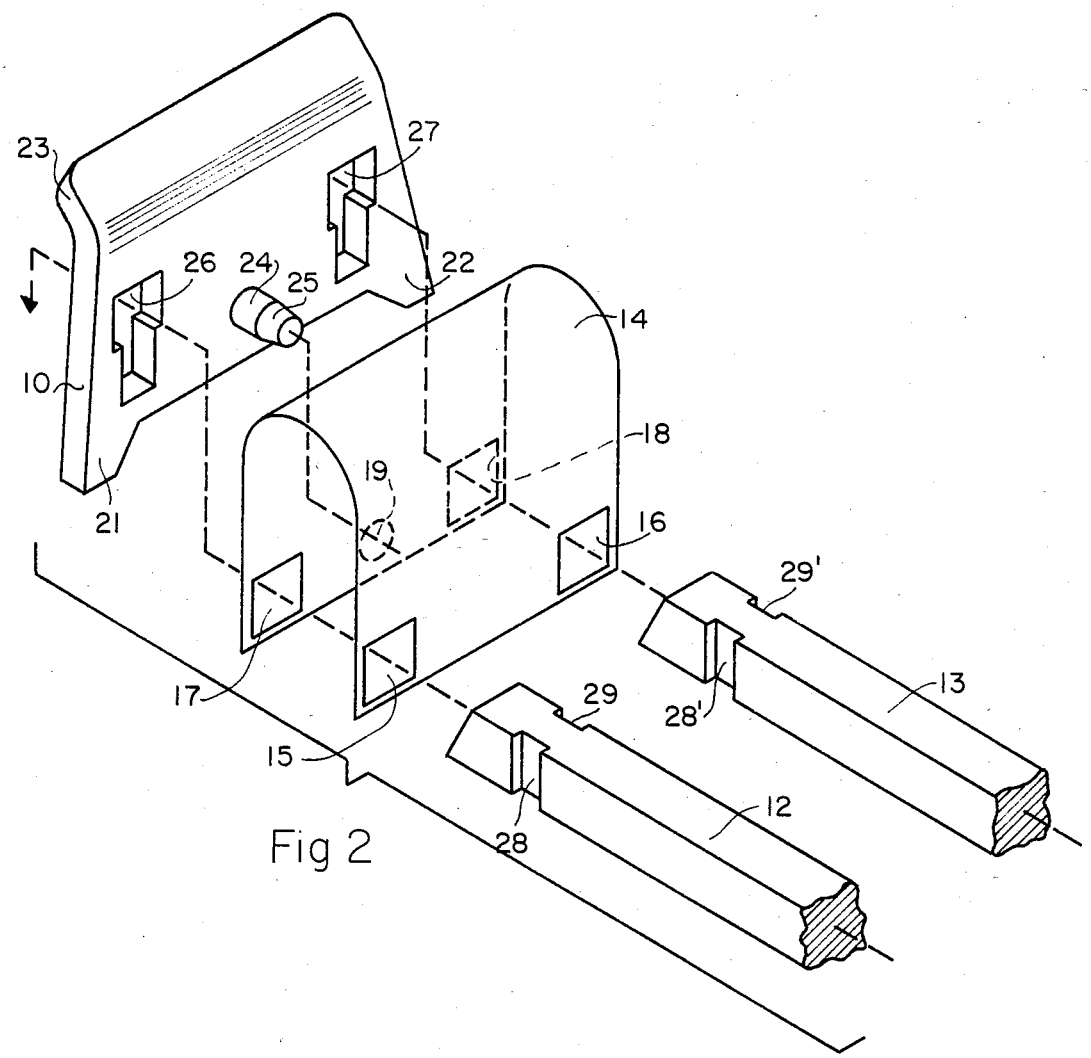
FIG. 2 is an exploded perspective view showing part of this diskette holder.

Referring first to FIGS. 1 and 2, in broad outline the present diskette holder comprises a pair of rigid, upstanding, opposite end pieces 10 and 11, laterally spaced, rigid, bottom rails 12 and 13 (FIG. 2) extending horizontally between the end pieces, and a plurality of flexible and resilient strips 14 each bent into an inverted U-shape and arranged end-to-end in succession along the bottom rails 12 and 13 between the end pieces 10 and 11.

Referring to FIGS. 8 and 9, each strip 14 is a thin, rectangular piece of vinyl or other suitable flexible and resilient, non-magnetic material, preferably plastic. Each strip 14 is preformed to be flat normally, i.e., when unstressed, and it is resiliently stressed when bent into the U-shape shown in FIG. 1. Each strip 14 is formed with a laterally spaced pair of rectangular openings 15 and 16 near one end, and a similar laterally spaced pair of openings 17 and 18 near the opposite end. The openings 15 and 17 are aligned with each other to receive the bottom rail 12 on one side of the assembly when the strip 14 is bent into an inverted U-shape, as shown in FIGS. 1 and 2. Likewise, the openings 16 and 18 are aligned with each other to receive the bottom rail 13 on the other side when strip 14 is flexed into its inverted U-shape. In one practical embodiment each strip is of glossy vinyl about 0.010 inch thick.

As shown in FIG. 8, each strip 14 is formed with a circular opening 19 near one end midway between the rectangular openings 17 and 18.

FIGS. 3 and 4 show the end piece 10 at the left end of the assembly in FIGS. 1 and 2. It comprises a flat wall 20 with downwardly projecting feet 21 and 22 on opposite sides and an upper end segment 23 which is bent upward away from the assembled inverted U-shaped strips 14. A horizontal stem 24 with a frustoconical end 25 extends longitudinally inward from wall 20 for snug reception in the opening 19 in the end-most strip 14. The wall 20 of the end piece has two laterally spaced, generally T-shaped openings 26 and 27, each of which is wider at the top than at the bottom.

The opposite end piece 11 is a mirror image of end piece 10 and will not be described in detail. Elements of the end piece 11 which correspond to elements of end piece 10 are given the same reference numerals with an "a" suffix added.

The two bottom rails 12 and 13 are identical and only rail 12 will be described in detail. The same reference numerals with a "prime" superscript added are used for rail 13.

Referring to FIGS. 5-7, rail 12 is of uniform rectangular cross section for most of its length. Close to its beveled left end in FIGS. 5 and 6, rail 12 is formed with rectangular vertical grooves 28 and 29 in its opposite sides. Similarly, near its beveled right end rail 12 is formed with rectangular vertical grooves 28a and 29a.

The bottom rail 12 is assembled to end piece 10 by inserting its beveled end through the wider upper part of the T-shaped opening 26 until its grooves 28 and 29 are in this opening, and then lowering this grooved part of the rail down into the narrower bottom part of opening 26, where it is received snugly but slidably.

Before the bottom rails 12 and 13 are assembled to the end pieces 10 and 11 in the manner just described for rail 12 and end piece 10, the spring strips 14 are assembled to both bottom rails 12 and 13, first by bending each strip 14 into an inverted U-shape, and then sliding its openings 15 and 17 along rail 12 and its openings 16 and 18 along rail 13. After the desired number of spring strips 14 have been assembled to the bottom rails 12 and 13, the bottom rails are inserted in the end pieces 10 and 11, as described. The stem 24 on the end piece 10 will snap into the opening 19 in the spring strip 14 closest to that end piece. The same action takes place between the opposite end piece 11 and the spring strip closest to it (which will be reversed from the position shown for the strip 14 in FIG. 2 so that the opening 19 will be next to the end piece 11).

From the foregoing it will be apparent that this holder can be readily assembled from the knocked-down condition of its several parts. FIG. 1 shows the holder with five spring strips 14 between its end pieces 10 and 11, providing six vertical slots into which identical floppy diskettes can be readily inserted and removed. In one practical embodiment these slots are about one inch apart, which makes it easy to insert or remove a diskette into or from a particular slot without disturbing the diskettes or envelopes in neighboring slots in the holder. This provides an inexpensive and very convenient organizer for several floppy diskettes which pertain to the same topic and which the operator of a computer keyboard may want to keep near each other for ready access.

A greater or smaller number of diskettes can be accommodated in the holder simply by providing longer or shorter bottom rails 12 and 13 on the holder assembly.

Usually, the end pieces 10 and 11 and the spring strips 14 will be wider for a holder intended for 8 inch floppy diskettes than for a holder intended for 5¼ inch diskettes although it is possible to use the same holder for different sized diskettes.

I claim:

1. A diskette holder comprising:
a plurality of separate flexible and resilient strips; and means for holding said strips each flexed into an inverted U-shape and assembled end-to-end in succession and disconnected from each other to resiliently hold diskettes inserted down between them, said means for holding said strips comprising upstanding end pieces at opposite ends of the assembled strips and longitudinal members extending horizontally between said end pieces and spaced apart laterally from each other and engaging each of said inverted U-shaped strips at laterally spaced locations thereon;

each of said strips having a pair of laterally spaced openings near each of its opposite ends;

said longitudinal members passing through the two openings on the corresponding side of each strip to hold the latter in its inverted U-shape;

each of said longitudinal members being a horizontally elongated, substantially straight, bottom rail located adjacent the bottom of each inverted U-shaped strip adjacent one side of the end-to-end assembly of said strips;

each of said bottom rails having vertical grooves therein near its opposite ends to provide narrower segments of the bottom rail;

and each of said end pieces having a pair of laterally spaced generally T-shaped openings which receive said bottom rails, each of said openings in the end piece being wider at the top to enable endwise insertion of the corresponding bottom rail and narrower below to snugly receive the corresponding narrower vertically grooved segment of that bottom rail;

each of said end pieces having a horizontal stem projecting longitudinally inward between said laterally spaced openings in that end piece;

and the inverted U-shaped strip next to each end piece having an opening which snugly receives said stem.

2. A diskette holder according to claim 1 wherein:
each of said strips is a thin sheet of vinyl preformed to a substantially flat shape and resiliently stressed when bent into a U-shape.

* * * * *